United States Patent [19]

Tanaka

[11] Patent Number: 4,658,416

[45] Date of Patent: Apr. 14, 1987

[54] AUTOMATIC CALL TRANSFER SYSTEM CAPABLE OF CARRYING OUT CALL TRANSFER WITHOUT MANUAL OPERATION

[75] Inventor: Minoru Tanaka, Tokyo, Japan

[73] Assignee: NEC Corporation, Japan

[21] Appl. No.: 700,107

[22] Filed: Feb. 11, 1985

[30] Foreign Application Priority Data

Feb. 14, 1984 [JP] Japan .................. 59-25506

[51] Int. Cl.⁴ .............................................. H04Q 7/04
[52] U.S. Cl. ........................................ 379/57; 379/57;
379/60; 379/211; 379/170; 340/825.44
[58] Field of Search .......... 179/2 EC, 18 BD, 18 BE,
179/18 BF, 18 B, 99 P; 340/825.44, 311.1,
825.45, 825.48; 455/33

[56] References Cited

U.S. PATENT DOCUMENTS

| | | | |
|---|---|---|---|
| 3,588,371 | 6/1971 | Dal Monte | 455/33 |
| 4,057,790 | 11/1977 | Fleming et al. | 340/224 |
| 4,174,476 | 12/1979 | Frost | 179/2 EC |
| 4,178,475 | 12/1979 | Taylor et al. | 179/2 EC |
| 4,313,035 | 1/1982 | Jordan et al. | 179/18 BF |
| 4,336,524 | 6/1982 | Levine | 340/825.44 |
| 4,468,813 | 8/1984 | Burke et al. | 179/18 B |
| 4,479,124 | 10/1984 | Rodriguez et al. | 340/825.44 |
| 4,567,323 | 1/1986 | Lottes et al. | 179/18 B |
| 4,577,060 | 3/1986 | Webb et al. | 179/2 EC |
| 4,577,062 | 3/1986 | Hilleary et al. | 179/2 A |
| 4,577,066 | 3/1986 | Bimonte et al. | 179/18 B |

Primary Examiner—Robert G. Lev
Attorney, Agent, or Firm—Laff, Whitesel, Conte & Saret

[57] ABSTRACT

In an automatic call transfer system for use in carrying out transfer of a terminating call from one of telephone sets (T) to another through an exchange (11), a person identification number (ID) is assigned to each of persons movable in a limited area and is generated from a transmitter (TX) conveyed by each person. The limited area is divided into a plurality of zones (Z) which are defined by receivers (RX) connected through subscriber lines to the exchange, respectively, and which include at least one of the telephone sets, respectively. The person identification number is produced from a transmitter (TX) conveyed by each person and is received by a selected one of the receivers in the zone for the selected receiver to be sent through one of the subscriber lines (L) to the exchange. A line number of the one subscriber line is memorized in a memory of the exchange in correspondence to the person identification number and is changed as each person moves in the limited area. Responsive to the terminating call carrying the person identification number, the exchange searches the memory to detect the line number memorized therein and to transfer the terminating call to one of the telephone sets indicated by the memorized line number.

7 Claims, 8 Drawing Figures

AUTOMATIC CALL TRANSFER SYSTEM CAPABLE OF CARRYING OUT CALL TRANSFER WITHOUT MANUAL OPERATION

BACKGROUND OF THE INVENTION

This invention relates to an automatic call transfer system for use in carrying out automatic transfer of a call by the use of an exchange.

A recent development of an electronic technique enables realization of various additional functions in the field of telephone exchange. Automatic transfer of a terminating call is known as one of such additional functions and serves to automatically transfer the terminating call in a limited area from a certain telephone set to another one by tracing a destination.

A conventional automatic call transfer system has been used wherein a destination directory number is manually registered into an exchange by a person when he leaves a seat assigned to him.

Another conventional system carries out automatic call transfer by the use of an automatic dialing set. With this system, a destination directory number is manually set by each person into the automatic dialing set and each call for the person in question is automatically transferred through a transfer line to a destination telephone assigned with the destination directory number.

At any rate, a manual operation should be carried out to set the destination directory number each time on occurrence of requests of transfer and is therefore troublesome for each person.

In addition, a person should have a destination directory number changed by any other person when moves among a plurality of different destinations or changes a destination on the midway. No change of the destination directory number results in wrong transfer of a call.

When a single directory number is used in common to a plurality of persons, inconvenience takes place such that a busy time becomes long. Furthermore, the transfer operation is carried out irrespective of an emergent call or a nonemergent one.

SUMMARY OF THE INVENTION

It is an object of this invention to provide an automatic call transfer system wherein no manual operation is necessary on carrying out transfer of a call.

It is another object of this invention to provide an automatic call transfer system of the type described, which can trace a destination directory number even when a person happens to move to a different destination, changing an initial destination on the midway to the different destination.

It is still another object of this invention to provide an automatic call transfer system of the type described, wherein inconvenience does not take place even when a telephone set is used in common to a plurality of persons.

It is yet another object of this invention to provide an automatic call transfer system of the type described, wherein transfer of a call can be requested by a particular person alone to prevent a nonemergent call from being transferred.

An automatic call transfer system to which this invention is applicable is for use in automatically carrying out call transfer by the use of an exchange which is coupled through subscriber lines to telephone sets, respectively. The telephone sets are specified by line numbers corresponding to the subscriber lines, respectively, and are distributed in an area so as to be utilized by persons movable in the area. According to this invention, a person identification number is assigned to each of specific ones of the persons so as to identify each specific person. The system comprises a plurality of receiving means coupled to the exchange and having receivable zones into which the area is divided so that at least one of the telephone sets is included in each of the receivable zones. Each of the receiving means is for receiving an identification number signal representative of the person identification number. The system further comprises signal generating means conveyed by each specific person for generating the identification number signal such that it is received by a selected one of the receiving means when each specific person is staying in the receivable zone for the selected one of said receiving means. The exchange comprises memory means coupled to the receivers for memorizing specific at least one of the line numbers of the receivable zone for the selected one of the receiving means in correspondence to the identification number signal and call transferring means coupled to the memory means and responsive to the call carrying the person identification number for transferring the call to the telephone set specified by the specific at least one of the line numbers with reference to the memorized identification number signal.

BRIEF DESCRIPTION OF THE DRAWING

FIG. 6 depicted below FIG. 2, is a time chart for use in describing operation of an automatic call transfer system according to a second embodiment of this invention;

DESCRIPTION OF THE PREFERRED EMBODIMENTS

Figure 1:
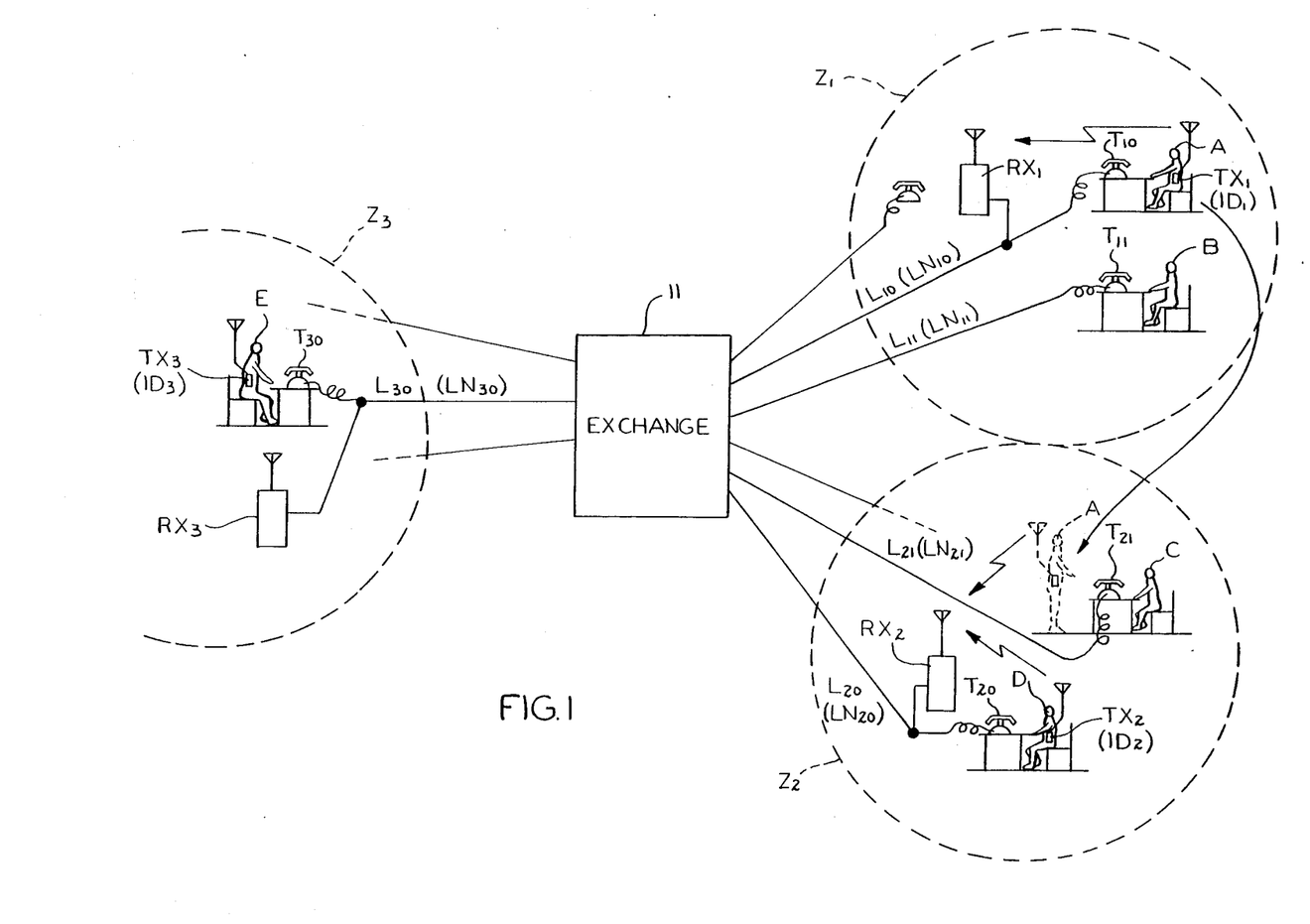
FIG. 1 is a schematic block diagram of an automatic call transfer system according to a first embodiment of this invention.

Referring to FIG. 1, an automatic call transfer system according to a first embodiment of this invention is for use in carrying out automatic call transfer by the use of an exchange 11 which will be described later and which may, for example, be a private branch exchange. The illustrated system comprises a plurality of telephone sets $T_{10}$, $T_{11}$, $T_{20}$, $T_{21}$, and $T_{30}$ distributed in a limited area of an office, a factory, or the like. The telephone sets T (suffixes omitted) are coupled to the exchange 11 through subscriber lines $L_{10}$, $L_{11}$, $L_{21}$, $L_{22}$, and $L_{30}$, respectively, and assigned with directory numbers TEL corresponding to line numbers $LN_{10}$, $LN_{11}$, $LN_{21}$, $LN_{22}$, and $LN_{30}$ of the subscriber lines $L_{10}$ through $L_{30}$, respectively.

It is assumed that each of the telephone sets T is assigned or dispensed to a single person A, B, C, D, or E, and disposed at his seat, although it is usable by any other persons and that specific ones A, D, and E of the persons are given first through third person identification numbers $ID_1$, $ID_2$, and $ID_3$ peculiar thereto. The persons A, D, and E will be named first, second, and third persons, respectively. Each of the persons A to E is assumed to free to move in the area.

In the example being illustrated, the area is divided into first through third zones $Z_1$, $Z_2$, and $Z_3$ which are determined by first through third radio receivers $RX_1$, $RX_2$, and $RX_3$, respectively. The first through third zones may partially be intersected to each other. The first through third radio receivers $RX_1$, $RX_2$, and $RX_3$ are disposed at center portions of the first through third zones $Z_1$, $Z_2$, and $Z_3$, respectively, and are connected to the exchange 11 through selected ones $L_{10}$, $L_{20}$, and $L_{30}$ of the subscriber lines of the first through third zones $Z_1$ to $Z_3$. Inasmuch as the selected subscriber lines $L_{10}$, $L_{20}$, and $L_{30}$ are also connected to the telephone sets $T_{10}$, $T_{20}$, and $T_{30}$, the first through third radio receivers $RX_1$, $RX_2$, and $RX_3$ are connected to the selected subscriber lines $L_{10}$, $L_{20}$, and $L_{30}$ in parallel to the telephone sets $T_{10}$, $T_{20}$, and $T_{30}$. From this fact, it is readily understood that the area is divided so that at least one of the telephone sets is placed in each of the first through third zones $Z_1$, $Z_2$, and $Z_3$.

The line numbers $LN_{10}$, $LN_{20}$, and $LN_{30}$ for the selected subscriber lines $L_{10}$, $L_{20}$, and $L_{30}$ may be called first, second, and third line numbers, respectively.

The first through third persons A, D, and E are possessed of first through third portable radio transmitters $TX_1$, $TX_2$, and $TX_3$ (will simply be called radio transmitters) which generate, as radio signals, first through third identification number signals representative of the first through third person identification numbers $ID_1$ to $ID_3$, respectively. Each radio signal may be of an ultra high frequency band and is produced by the portable radio transmitters TX with electric power of, for example, 0.1 milliwatt.

Figure 2:
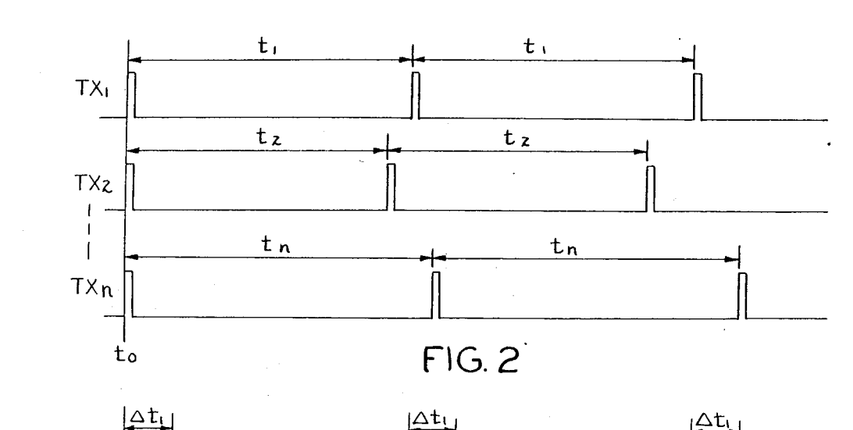
FIG. 2 is a time chart for use in describing operation of a radio transmitter illustrated in FIG. 1.

Temporarily referring to FIG. 2, the portable radio transmitters TX are assumed to be equal in number to n in FIG. 2 and produce the given or assigned identification number signals (ID) as successions of first through n-th bursts, respectively. For example, the first portable radio transmitter $TX_1$ produces the first bursts having a first period $t_1$, as illustrated along a top line $TX_1$ of FIG. 2. Each of the first bursts carries the first identification number signal ($ID_1$) The second portable radio transmitter $TX_2$ produces the second bursts appearing in a second period $t_2$ which is different from the first period $t_1$. Like each of the first bursts, each of the second bursts conveys the second identification number signal ($ID_2$). Likewise, the n-th bursts have an n-th period $t_n$ inherent to the n-th bursts and carry an n-th identification number signal ($ID_n$).

Thus, the burst successions have different periods from one another in consideration of collision among the identification number signals (ID) in a single one of the zones Z. For example, a plurality of the burst successions illustrated in FIG. 2 collide with one another at a time instant $t_0$. When the collision takes place in the same zone $Z_1$, $Z_2$, or $Z_3$, each radio receiver $RX_1$, $RX_2$, or $RX_3$ can not receive and reproduce any identification number signals ID. However, the collision is dissolved when the next following burst is received because of the different periods of the burst successions.

Turning back to FIG. 1, each of the first through third identification number signals ($ID_1$) to ($ID_3$) can be received by the first through third receivers $RX_1$ to $RX_3$ in the first through third zones $Z_1$ to $Z_3$. In this sense, each of the first through third zones $Z_1$ to $Z_3$ may be called a receivable zone for the radio signals, namely, the first through third identification number signals ($ID_1$) to ($ID_3$). Practically, each of the first through third zones $Z_1$ to $Z_3$ may have a radius between 5 meters and 10 meters in consideration of the electric power of the first through third radio transmitters $TX_1$ to $TX_3$. This implies that the radio receivers may be spaced with a distance of 10–20 meters left therebetween.

With this system, the radio receivers RX transfer the person identification numbers ID (suffix omitted) as electric identification signals to the exchange 11 through the first through third subscriber lines $L_{10}$, $L_{20}$, and $L_{30}$ in response to the radio signals carrying the first through third identification signals.

Figure 3:
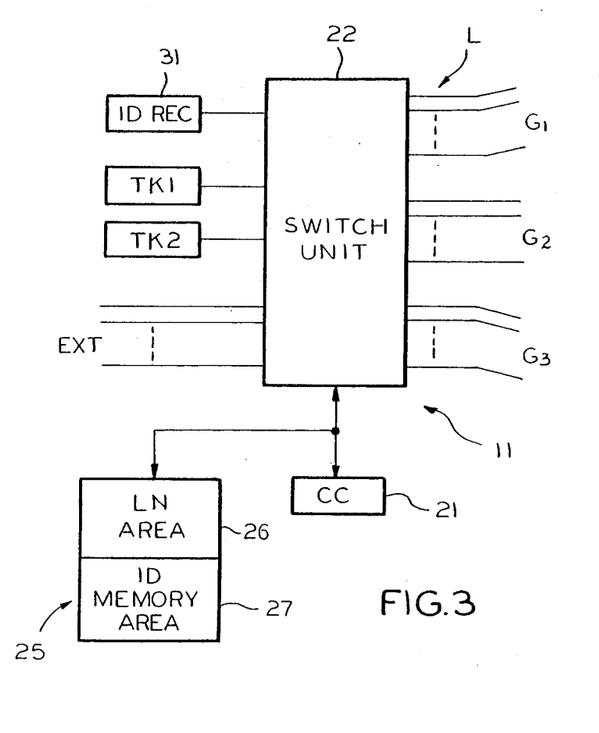
FIG. 3 is a block diagram of an exchange for use in the automatic call transfer system illustrated in FIG. 1.

Referring to FIG. 3 together with FIG. 1, the illustrated exchange 11 accommodates the subscriber lines L (suffixes omitted) clustered into a plurality of groups $G_1$, $G_2$, and $G_3$ which are distributed to different ones of the receivable zones Z. Let the groups $G_1$, $G_2$, and $G_3$ include the subscriber lines $L_{10}$, $L_{11}$; $L_{20}$, $L_{21}$; and $L_{30}$ (FIG. 1) connected to the telephone sets of the first through third zones $Z_1$ to $Z_3$, respectively. The exchange 11 also accommodates a plurality of external lines EXT, such as main wires, connected to another exchange or the like.

As is known in the art, the exchange 11 comprises a central control unit (CC) 21 and a switch or link unit 22 operable under control of the central control unit 21 to connect or disconnect the subscriber lines L, the external lines, and the like.

In FIG. 3, the exchange 11 further comprises a subscriber memory 25 for temporarily memorizing status of each subscriber. The illustrated subscriber memory 25 is connected to the central control unit 21 and the switch unit 22 through buses and has a line number (LN) area 26 and an identification (ID) memory area 27. The line number area 26 has first local addresses which correspond to the line numbers LN, respectively, and which are loaded in a known manner with electric signals necessary for the exchange 11. The identification memory area 27 has second local addresses which correspond to the person identification numbers ID, respectively, and each of which is loaded with the line numbers LN assigned to the subscriber lines L. Each line number LN in the identification memory area 27 specifies a neighboring one of the subscriber lines, namely, telephone sets near to each person. Thus, the person identification numbers ID are made to correspond to the line numbers in the identification memory area 27. It is therefore possible to detect each position of the specific persons by searching the identification memory area 27 by the use of the person identification numbers ID and by reading the line numbers LN out of the identification number area 27.

The illustrated exchange 11 further comprises an identification number receiver (ID REC) 31 for receiving the identification number signals (ID) and first and second talkie units or trunks, namely, audio response units or trunks $TK_1$ and $TK_2$ which are operable in a manner to be described later.

Figure 4:
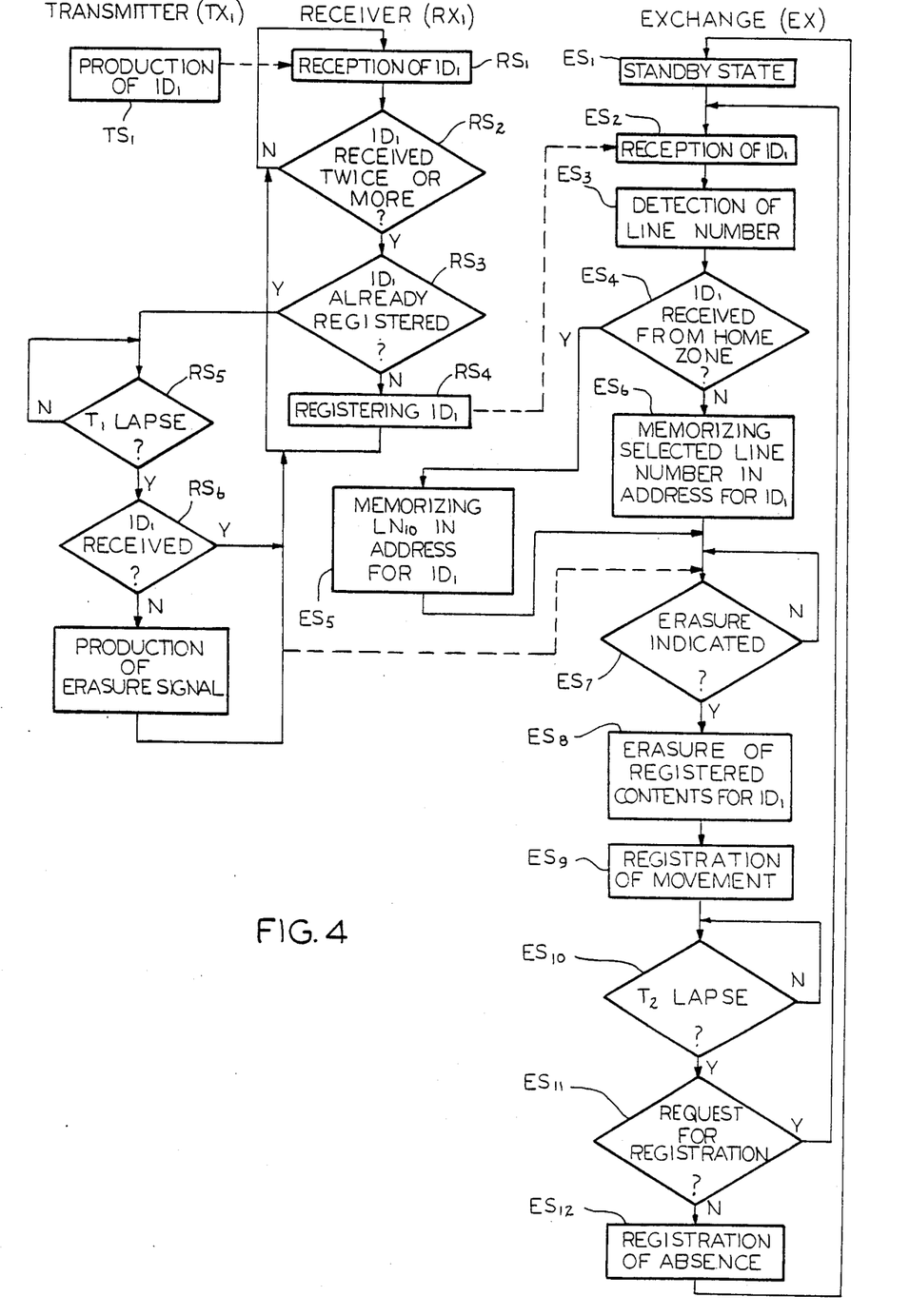
FIG. 4 is a flow chart for use in describing operation of the transmitter, the exchange, and a receiver which are all illustrated in FIG. 1.

Referring to FIG. 4 together with FIGS. 1 through 3, operation of the system will be exemplified in connection with the first person A which is given the first identification number $ID_1$ and his seat in the first zone $Z_1$, as illustrated in FIG. 1. The first zone $Z_1$ may be called a home zone for the first person A. The first person A always has the first radio transmitter $TX_1$ with him either in his pocket or otherwise. The first identification number $ID_1$ is generated in the manner described with reference to FIG. 2 by the first radio transmitter $TX_1$ as the radio signal, as illustrated at a transmitter step $TS_1$ in FIG. 4.

The radio signal representative of the first identification number $ID_1$ is received by the first radio receiver $RX_1$ placed in the first zone $Z_1$ as long as the first person A is present in his own seat, as shown at a first receiver step $RS_1$ in FIG. 4. As previously mentioned in conjunction with FIG. 2, the first identification number $ID_1$ is carried by each burst intermittently appearing at the first period $t_1$. On reception of the first identification number $ID_1$ only one time, the first person A in question may happen to merely pass by and may not be staying in the first zone $Z_1$.

In order to confirm stay of the first person A in the first zone $Z_1$, the first radio receiver $RX_1$ monitors whether or not the first identification number $ID_1$ is consecutively received twice or more, as shown at a second receiver step $RS_2$ in FIG. 4. When the first identification number $ID_1$ is successively received plural times, the second step $RS_2$ proceeds to a third receiver step $RS_3$. Otherwise, the second receiver step $RS_2$ returns back to the first step $RS_1$.

At the third receiver step $RS_3$, the first radio receiver $RX_1$ judges whether or not the first identification number $ID_1$ was already registered in the first radio receiver $RX_1$. If the first identification number $ID_1$ is not registered in the first radio receiver $RX_1$ yet, the first radio receiver $RX_1$ registers the first identification number $ID_1$ at a fourth receiver step $RS_4$ through the subscriber line $L_{10}$.

When the first identification number $ID_1$ was already registered in the first radio receiver $RX_1$, the first radio receiver $RX_1$ must monitor whether or not the registered number, namely, the first identification number $ID_1$ is to be erased or released from the exchange 11 because the first person A may move from the first zone $Z_1$ to another one. For this purpose, the first radio receiver $RX_1$ supervises lapse of a first predetermined duration $T_1$ by the use of a timer (not shown) at a fifth receiver step $RS_5$. The first predetermined duration $T_1$ may be, for example, one minute.

After lapse of the predetermined duration $T_1$, the fifth receiver step $RS_5$ is followed by a sixth receiver step $RS_6$ at which the receiver $RX_1$ judges whether or not the first identification number $ID_1$ is being received by the first radio receiver $RX_1$. On reception of the first identification number $ID_1$, the sixth receiver step $RS_6$ returns back to the first receiver step $RS_1$. Otherwise, the sixth receiver step $RS_6$ is followed by a seventh receiver step $RS_7$ at which the first radio receiver $RX_1$ sends the exchange 11 an erasure signal indicative of erasure of the registered, namely, first identification number.

In FIG. 4, the exchange 11 is put into a standby or waiting state at a first exchange step $ES_1$ for awaiting reception of any electric identification number signals representative of the person identification numbers ID. At a second exchange step $ES_2$ following the first exchange step $ES_1$, the exchange 11 receives the first identification number $ID_1$ at the identification number receiver (ID REC) 31 (FIG. 3) thereof. The central control unit 21 is operated at a third exchange step $ES_3$ in a known manner to detect the line number of the subscriber line through which the first identification number $ID_1$ is received. In the example being illustrated, the line number $LN_{10}$ of the subscriber line $L_{10}$ is detected by the central control unit 21.

After detection of the line number $LN_{10}$, the central control unit 21 detects whether or not the received identification number, namely, $ID_1$ is sent from the home zone $Z_1$, as shown at a fourth exchange step $ES_4$. If the first identification number $ID_1$ is sent from the home zone $Z_1$, the central control unit 21 accesses the identification memory area 27 (FIG. 3) at a fifth exchange step $ES_5$ to memorize the line number $LN_{10}$ in a specific one of the second memory addresses that is assigned to the first identification number $ID_1$. Thus, the line number $LN_{10}$ for the first person A is memorized in the identification number memory 27 in correspondence to the first identification number $ID_1$ for the first person A as long as he is staying in the first or home zone $Z_1$.

On the other hand, when the first identification number $ID_1$ is not sent from the first or home zone $Z_1$, the specific address for the first identification number $ID_1$ is loaded at a sixth exchange step $ES_6$ with a selected one of the line numbers which are assigned to each of the remaining zones, namely, the second or the third zones $Z_2$ or $Z_3$. The selected line number may be, for example, a pilot number of each zone. In the example being illustrated, the line numbers $LN_{20}$ and $LN_{30}$ are memorized in the specific address for the first identification number $ID_1$ when the first person A is staying in the second and the third zones $Z_2$ and $Z_3$, respectively.

At a seventh exchange step $ES_7$, the central control unit 21 judges whether or not the erasure signal is sent from the first radio receiver $RX_1$ to erase contents of the specific address which are related to the first identification number $ID_1$. Responsive to the erasure signal, the central control unit 21 erases the contents of the specific address, as shown at an eighth exchange step $ES_8$.

The erasure signal is produced either during a short absence of the first person A or during his long absence. During the short absence, the first person A may be in course of moving from one zone to another. During the long absence, the first person A is probably absent from the limited area. Under the circumstances, registration is made at a ninth exchange step $ES_9$ in the specific address for the first identification number $ID_1$ to indicate that the first person A is in course of movement. After the registration, the central control unit 21 times a second predetermined duration $T_2$ of, for example, five minutes at a tenth exchange step $ES_{10}$.

Lapse of the second predetermined duration $T_2$ may regard the first person A as absent from the limited area. In the example, the central control unit 21 detects presence or absence of a request for registration related to the first identification number $ID_1$ at an eleventh exchange step $ES_{11}$ after lapse of the second predetermined duration $T_2$. Thereafter, the central control unit 21 registers absence of the first person A in the specific address for the first identification number $ID_1$ at a twelfth exchange step $ES_{12}$.

After registration of absence, the twelfth exchange step $ES_{12}$ is followed by the second exchange step $ES_2$ mentioned before.

It is readily understood from the above that the line number $LN_{10}$ for the telephone set $T_{10}$ is memorized in the specific address assigned to the first identification number $ID_1$ as long as the specific person A is present in the first zone $Z_1$.

Let the first person A leave his seat and meet another person C in the second zone $Z_2$ to make arrangements with him. In this event, the radio signal generated by the first radio transmitter $TX_1$ can not be received by the first radio receiver $RX_1$ because it is very weak in intensity as mentioned before when the first person A arrives at the seat of another person C. Instead, the second radio receiver $TX_2$ in the second zone $Z_2$ receives the radio signal of the first radio transmitter $TX_1$. Inasmuch as the second radio receiver $TX_2$ and the telephone set $T_{20}$ are connected to the subscriber line $L_{20}$ in common, the first identification number $ID_1$ is sent through the subscriber line $L_{20}$ to the exchange 11. When the first identification number $ID_1$ is detected from the radio signal twice or more in the manner illustrated in conjunction with FIG. 4, the identification memory area 27 is renewed from the line number $LN_{10}$ into the line number $LN_{20}$ at the specific address assigned to the first identification number $ID_1$.

This means that a terminating call for the first person A is transferred to the telephone set $T_{20}$ placed at the seat of the second person D while the first person A is staying in the second zone $Z_2$. In other words, the terminating call for the first person A is not transferred to the telephone set $T_{21}$ placed at the seat of the person C talking with the first person A. However, no problem might occur because each zone is very narrow.

Thus, the identification memory area 27 is successively and automatically renewed at the specific address assigned to the first identification number $ID_1$ as the first person A moves in the limited area. Similar operation is carried out as regards the second and the third persons D and E.

From the above, it is readily understood that the identification memory area 27 is renewed only when each specific person changes the zones from one to another. Accordingly, it is possible to prevent the subscriber lines, such as $L_{10}$, $L_{20}$, and $L_{30}$, from being occupied by the radio receivers for a long time. Consequently, usual communication is also carried out through the subscriber lines $L_{10}$, $L_{20}$, and $L_{30}$.

Figure 5:
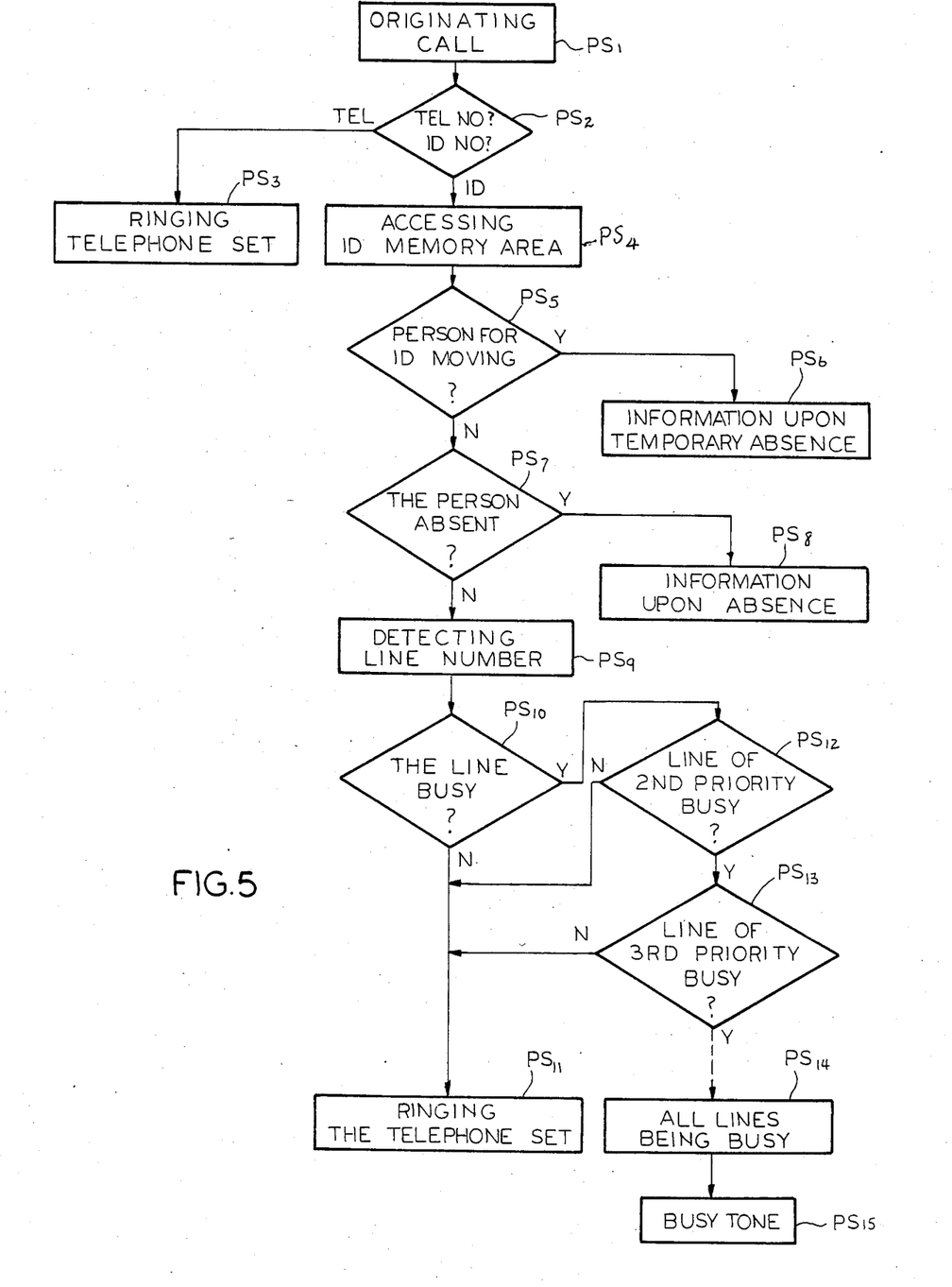
FIG. 5 is a flow chart for use in describing another operation of the exchange illustrated in FIG. 3.

Referring to FIG. 5 afresh and FIGS. 1 and 3 again, operation of the central control unit 21 will be described on the assumption that the exchange 11 receives a terminating call through one of the subscriber lines L and the external lines EXT, as shown at a first processing step $PS_1$ in FIG. 5. The terminating call is accompanied either by a directory number TEL or by a person identification number ID. If the directory number TEL is detected at a second processing step $PS_2$, the central control unit 21 rings one of the telephone sets that is indicated by the directory number TEL, as shown at a third processing step $PS_3$.

If the terminating call carries the person identification number ID, the central control unit 21 accesses the identification memory area 27 at a fourth processing step $PS_4$ to detect contents of an address assigned to the person identification number ID at a fifth processing step $PS_5$. When the contents of the address in question are indicative of the fact that the person for the person identification number ID is in course of moving, as illustrated at the ninth exchange step $ES_9$, the central control unit 21 energizes the first talkie unit $TK_1$ (FIG. 3) at a sixth processing step $PS_6$. The first talkie unit $TK_1$ gives information upon a short absence in the form of an audio signal.

Unless the person under consideration is in course of movement, the fifth processing step $PS_5$ is followed by a seventh processing step $PS_7$ at which the central processing unit 21 judges whether or not he is absent from the limited area. When absence of the person is registered in the manner illustrated in conjunction with the twelfth exchange step $ES_{12}$ of FIG. 4, the second talkie unit $TK_2$ is energized to give information upon a long absence of the person assigned with the person identification number ID in question at an eighth processing step $PS_8$. Otherwise, the seventh processing step $PS_7$ is succeeded by a ninth processing step $PS_9$ at which the line number LN is detected from the contents of the address for the person identification number ID.

The central control unit 21 judges at a tenth processing step $PS_{10}$ whether or not the subscriber line L specified by the line number LN is put into a busy state. Unless the subscriber line LN is busy, the central control unit 21 rings one of the telephone sets that is placed in a destination one of the zones Z and is connected to the subscriber line LN in the destination zone, as shown at an eleventh processing step $PS_{11}$.

In the example being illustrated, the telephone sets in the destination zone are successively searched to detect an idle one of the telephone sets in the order of priority predetermined in the destination zone when one of the telephone sets in the destination zone is put into a busy state. For this purpose, the central control unit 21 matches states of the subscriber lines L included in the destination zone in the order of the priority. For example, judgement is made at a twelfth processing step $PS_{12}$ to indicate whether or not the subscriber line of second priority is busy. Similarly, judgement is made as regards the subscriber line of third priority at a thirteenth processing step $PS_{13}$.

At any rate, one of the telephone sets is rung in the destination zone at the eleventh processing step $PS_{11}$, if an idle one of the subscriber lines L is found out. Thus, a destination of each specific person is automatically sought by the central control unit 21 with reference to each person identification number ID to ring a neighboring one of the telephone sets through the switch unit 22. When all of the subscriber lines L are regarded as busy at a fourteenth processing step $PS_{14}$, a busy tone is produced as shown at a fifteenth processing step $PS_{15}$. Thus, a combination of the central control unit 21 and the switch unit 22 serves to transfer the terminating call and may be called a call transfer member.

From the above, it is readily understood that the above-mentioned call transfer is carried out only when one of the person identification numbers ID is given to the exchange 11. If a particular one of persons is informed of the one of the person identification numbers assigned to a specific person and calls the specific person by the use of the one person identification number only in case of emergency, an emergent call alone is favorably transferred to the specific person. In addition, the call transfer is carried out without any manual operation.

Figure 6:
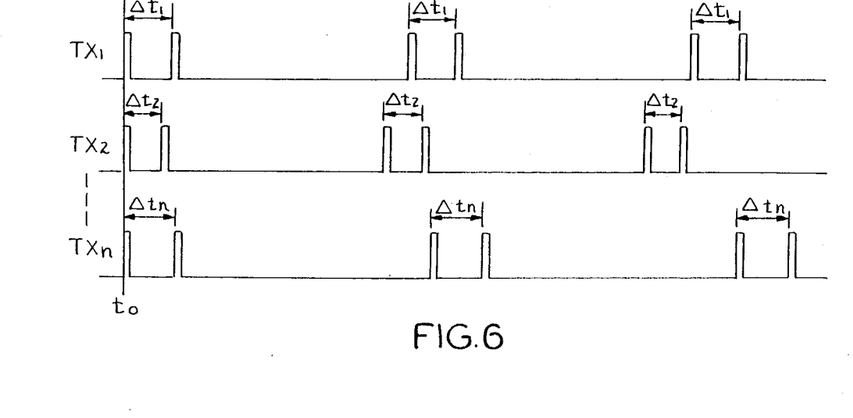
Figure 7:
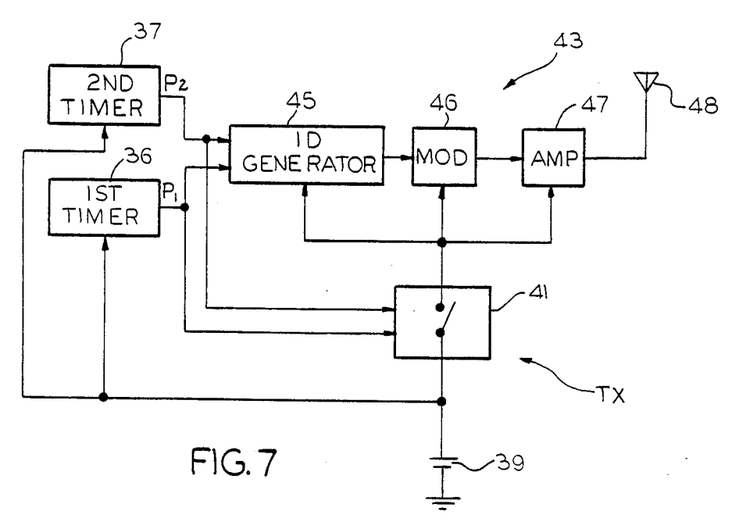
FIG. 7 is a block diagram of a radio transmitter for use in the automatic call transfer system illustrated in conjunction with FIG. 6.
Figure 8:
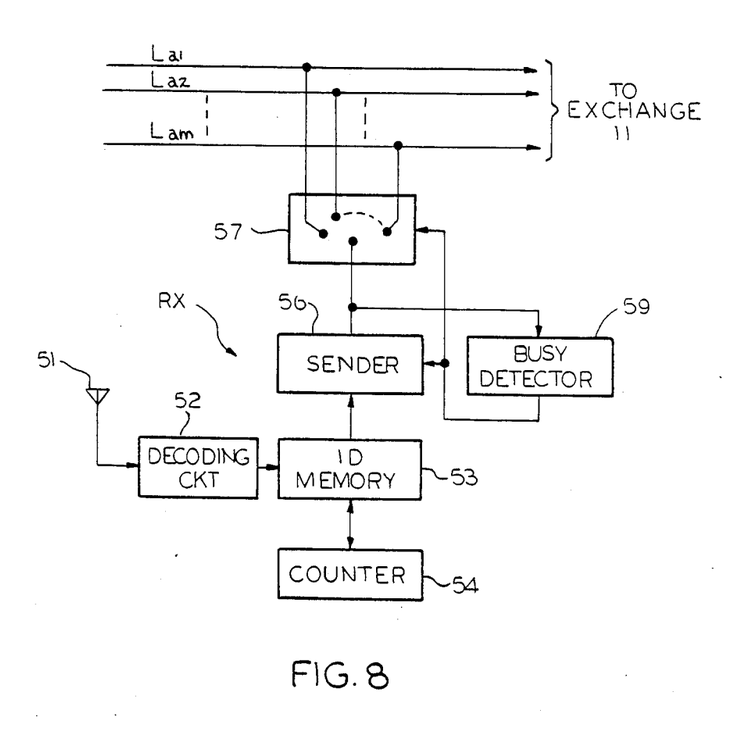
FIG. 8 is a block diagram of a radio receiver operable in cooperation with the radio transmitter illustrated in FIG. 7.

Referring to FIGS. 6, 7, and 8, an automatic call transfer system according to a second embodiment of this invention carries out automatic call transfer by the use of first through n-th burst successions as illustrated along top through bottom lines $TX_1$ to $TX_n$ of FIG. 6. More particularly, each burst succession has a pair of bursts each of which carries a person identification number assigned to each specific person. The bursts of each pair consist of a leading and a trailing one.

The illustrated leading bursts of each burst succession are repeated at a period peculiar to the burst succession, like the burst successions illustrated in FIG. 2. Therefore, the first burst succession illustrated along the top line $TX_1$ of FIG. 6 includes the leading bursts appearing in the first period $t_1$ as shown in FIG. 2. Likewise, the second through n-th burst successions $TX_2$ to $TX_n$ include the leading bursts having the second through n-th periods $t_2$ to $t_n$, respectively.

The leading bursts of each burst succession are followed by the trailing bursts spaced apart from the leading ones with a time interval $\Delta t_1$, $\Delta t_2$, ..., or $\Delta t_n$ left therebetween. The time intervals $\Delta t_1$ through $\Delta t_n$ are inherent to the burst successions $TX_1$ to $TX_n$, respectively, and shorter than the periods, respectively. Thus, each burst succession has the period, such as $t_1$, $t_2$, ..., or $t_n$, and the time interval, such as $\Delta t_1$, $\Delta t_2$, ..., or $\Delta t_n$, peculiar thereto.

Let the leading bursts of the first through n-th burst successions happen to appear in a single zone simultaneously with one another at a time instant $t_0$ in FIG. 6. In this event, the radio receiver RX can not distinguish the person identification numbers ID from one another. However, the radio receiver can receive each person identification number twice after both of each time interval $\Delta t$ (suffixes omitted) and each period t. The person identification numbers are therefore rapidly detected twice or more from each burst succession in comparison with the burst successions illustrated in FIG. 2.

In FIG. 7, each radio transmitter TX comprises first and second timers 36 and 37 for measuring each period t and each time interval $\Delta t$ both of which are peculiar to the burst succession, respectively. The first and second timers 36 and 37 are always energized by a battery 39 to produce a succession of first pulses $P_1$ at each period t and a succession of second pulses $P_2$ appearing when each time interval $\Delta t$ lapses after the first pulses $P_1$. The first and the second pulses $P_1$ and $P_2$ last during the bursts.

A switch 41 is closed during presence of the first and the second pulses $P_1$ and $P_2$ to intermittently connect the battery 39 to an identification signal circuit 43. The identification signal circuit 43 comprises an identification (ID) number generator 45, a modulator 46, and an amplifier 47, which are all simultaneously energized by the battery 39. The person identification number is intermittently generated by the identification number generator 45 and is subjected to modulation and amplification by the modulator 46 and the amplifier 47 to be produced as a radio signal through an antenna 48.

The radio signal is received by a radio receiver RX illustrated in FIG. 8 and is sent through a reception antenna 51 to a decoding circuit 52 to be decoded into a decoded signal representative of the person identification number ID. The decoded signal is memorized in an identification number memory 53 and is counted by a counter 54 which is counted up at every reception of the decoded signal. When the same decoded signal is received twice or more, the identification number memory 53 sends the decoded signal through a sender 56 and a selector 57 to one of the subscriber lines indicated at $L_{a1}$, $L_{a2}$, ..., and $L_{am}$.

A busy detector 59 is coupled to the sender 56 and the selector 57. The busy detector 59 successively searches the subscriber lines $L_{a1}$ to $L_{am}$ to detect an idle one of the subscriber lines $L_{a1}$ to $L_{am}$. On detection of the idle subscriber line, the busy detector 59 connects the selector 57 to the idle subscriber line. As a result, the decoded signal carrying the person identification number is sent through the idle subscriber line to the exchange 11. The illustrated radio receiver RX is assigned with a plurality of the subscriber lines $L_{a1}$ to $L_{am}$.

As mentioned before, the terminating call is automatically transferred to each of the specific persons given the person identification numbers even when each specific person frequently changes a destination from one to another in the limited area and even when each specific person forgets to inform of change of the destination. In addition, the above-mentioned call transfer can be individually carried out about each of persons to which a single telephone is dispensed, when the different person identification numbers are assigned to the respective persons.

The periods $t_1$ through $t_n$ of the bursts may be decided in consideration of the number of the specific persons, areas of the zones, and electric power of the radio transmitters. Preferably, the periods t are longer than a time necessary for passing through each zone. Anyway, production of the bursts results in a reduction of electric power consumption in each radio transmitter TX.

In addition, each of the radio receivers may convert the person identification number ID into an electric signal of a frequency band higher than an audio frequency band. The electric signal may thereafter be subjected to demodulation by the exchange 11 to be rendered into the audio frequency band. Instead of searching an idle of the subscriber lines, an offering connection may be made to preferentially carry out call transfer on reception of a terminating call when a subscriber line in question is busy.

While this invention has thus far been described in conjunction with a few embodiments thereof, it will readily be possible for those skilled in the art to put this invention into practice in various other manners. For example, each radio receiver may directly transfer the received person identification numbers ID to the exchange 11 without passing through the identification memory 53 as illustrated in FIG. 8. In this event, the central control unit 21 should carry out operations as illustrated at the second through seventh receiver steps $RS_2$ to $RS_7$ (FIG. 4) instead of the radio receivers RX, although the subscriber lines $L_{10}$, $L_{20}$, and $L_{30}$ may be occupied by the radio receivers RX for a long time. The radio receivers RX may not always be connected in parallel to the telephone sets, such as $T_{10}$, $T_{20}$, and $T_{30}$, but may be connected through exclusive lines. The bursts illustrated in FIGS. 2 and 6 may be variable in their periods and time intervals to avoid concurrent occurrence of the bursts. In lieu of the bursts, the person identification numbers ID may be produced in a frequency division fashion when the exchange 11 has a comparatively small capacity and may be continuously produced by each radio transmitter. The exchange may not be a private branch exchange. When the receivable zones $Z_1$, $Z_2$, and $Z_3$ are partially intersected to one another, each person identification number may be received by a plurality of the radio receivers RX. If an intersected portion includes the home zone, the person identification number may be registered in the home zone in preference to the other zone or zones. If no home zone is included in the intersected portion, the person identification number may be registered in one of the receivable zones that receives a new one of the person identification numbers. The receivable zones may not always cover the whole of the limited area because the short absence can be indicated in the illustrated system.

Furthermore, ultrasonic waves may be used to couple the transmitters TX to the receivers RX instead of the radio signals. An inductive radio method may be used to couple the transmitters TX and the receivers RX.

In any event, no manual operation is necessary to register each line number of the destination zone because each line numbers is successively and automatically memorized and renewed in the identification memory area 27.

What is claimed is:

1. In an automatic call transfer system for use in automatically carrying out transfer of a call by the use of an exchange which is coupled through subscriber lines to telephone sets, respectively, said telephone sets being specified by line numbers corresponding to said subscriber lines, respectively, and being distributed in an area so as to be utilized by persons movable in said area, the improvement wherein:

a person identification number is assigned to each of specific ones of said persons so as to identify said each specific person;

said system comprising:

a plurality of receiving means coupled to said exchange and having receivable zones into which said area is divided so that at least one of said telephone sets is included in each of said receivable zones, each of said receiving means being for receiving an identification number signal representative of said person identification number; and signal generating means conveyed by said each specific person for generating said identification number signal such that it is received by a selected one of said receiving means when said each specific person is staying in the receivable zone for said selected one of said receiving means;

said exchange comprising:

memory means coupled to said receivers for memorizing specific at least one of the line numbers of the receivable zone for said selected one of said receiving means in correspondence to said identification number signal; and call transferring means coupled to said memory means and responsive to the call carrying said person identification number for transferring the call to the telephone set specified by said specific at least one of said line numbers with reference to the memorized identification number signal.

2. An automatic call transfer system as claimed in claim 1, wherein said signal generating means produces said identification number signal in the form of a radio signal while each of said receivers produces an electric identification signal representative of said person identification number in response to said radio signal.

3. An automatic call transfer system as claimed in claim 2, wherein said signal generating means comprises:

burst producing means for producing a succession of bursts each of which carries said identification number signal and has a predetermined period peculiar to said person identification number; and means for producing said succession as said radio signal.

4. An automatic call transfer system as claimed in claim 2, wherein said signal generating means comprises:

burst pair producing means for repeatedly producing a pair of bursts each of which carries said person identification number, said bursts of each pair appearing with a burst interval left therebetween and being specific to said person identification number; and means for producing said pair of bursts as said radio signal.

5. An automatic call transfer system as claimed in claim 2, wherein each of said receiving means comprises:

local memory means for memorizing said electric identification signal; and sending means for sending said memorized electric identification signal to said exchange only on occurrence of variation of the person identification number conveyed by said radio signal.

6. An automatic call transfer system as claimed in claim 5, wherein each of said receiving means further comprises:

monitoring means coupled to said sending means and the subscriber lines for each receivable zone for monitoring the subscriber lines to detect an idle one of the subscriber lines and to deliver said memorized electric identification signal to said idle subscriber line.

7. An automatic call transfer system as claimed in claim 1, wherein said signal generating means is coupled to each of said receivers by the use of ultrasonic waves.

* * * * *